US006269240B1

(12) United States Patent
Chong et al.

(10) Patent No.: US 6,269,240 B1
(45) Date of Patent: Jul. 31, 2001

(54) SLIDABLE CONNECTION FOR A RETRACTABLE ANTENNA TO A MOBILE RADIO

(75) Inventors: Kok-Huat Chong; Michael Chernus; Billy James Whitmarsh; Peter Sroka, all of San Diego, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/330,603

(22) Filed: Jun. 11, 1999

Related U.S. Application Data

(60) Provisional application No. 60/089,074, filed on Jun. 21, 1998.

(51) Int. Cl.[7] .......... H04B 1/38

(52) U.S. Cl. .......... 455/73; 455/575; 455/550; 455/129

(58) Field of Search .......... 455/575, 90, 550, 455/129, 351, 269, 280; 343/702

(56) References Cited

U.S. PATENT DOCUMENTS 5,781,867 * 7/1998 Tidwell .......... 455/575
5,819,185 * 10/1998 Umezawa et al. .......... 455/575
5,901,367 * 5/1999 Toh .......... 455/575
5,920,292 * 7/1999 O'Neill, Jr. .......... 343/895
6,002,377 * 12/1999 Huynh et al. .......... 343/895

* cited by examiner

*Primary Examiner*—William G. Trost
*Assistant Examiner*—Marceau Milord
(74) *Attorney, Agent, or Firm*—John T. Whelan; Michael W. Sales

(57) ABSTRACT

A system for slidable connection of a satellite antenna to a mobile radio comprising: the satellite antenna including a satellite antenna element and at least one antenna contact coupled thereto; and at least one slide strip, slidably coupled with the at least one antenna contact when the antenna is in a plurality of retracted positions, the at least one slide strip being coupled to a transceiver in the mobile radio and conducting radio-frequency signals to maintain communication with the mobile radio. A method for slidable connection of an antenna to a mobile radio comprising the steps of: providing a satellite antenna and at least one antenna contact coupled thereto; providing at least one slide strip coupled to a transceiver and configured to be slidably coupleable with the at least one antenna contact; sliding the satellite antenna into a plurality of retracted positions and connecting the at least one antenna contact with the at least one slide strip, wherein the satellite antenna maintains a connection to the transceiver while sliding through the plurality of retracted positions.

12 Claims, 9 Drawing Sheets

SATELLITE TELEPHONE

SATELLITE MOBILE RADIO
OR SATELLITE TELEPHONE

EXTENDED SATELLITE ANTENNA (ANTENNA EXTENDED DURING NORMAL USE)

RETRACTED SATELLITE ANTENNA (ANTENNA RETRACTED DURING STANDBY)

DOCKED SATELLITE ANTENNA (ANTENNA SLIGHTLY EXTENDED TO DISCONNECT SLIDE STRIPS)

PERSPECTIVE VIEW OF SATELLITE ANTENNA AND POLYAMIDE BODY

STRIP SUBASSEMBLY
CROSS SECTIONAL VIEW

SLIDING ANTENNA DESIGN WITH PHASING/ IMPEDANCE MATCHING CIRCUIT BEFORE SLIDABLE STRIPS

SLIDING ANTENNA DESIGN WITH PHASING AFTER SLIDABLE STRIPS

PERSPECTIVE VIEW OF INTEGRATED ANTENNA

DOCKED SATELLITE TELEPHONE

SLIDABLE CONNECTION FOR A RETRACTABLE ANTENNA TO A MOBILE RADIO

This application claims priority under 35 U.S.C. §119(e) from U.S. Provisional Patent Application Ser. No. 60/089,074, filed Jun. 12, 1998.

BACKGROUND OF THE INVENTION

The present invention relates to a low-loss slidable connection of an antenna and more particularly to a low-loss slidable connection of a satellite antenna to a satellite mobile radio. Even more particularly, the invention relates to a low-loss slidable connection for a satellite antenna wherein a satellite telephone maintains communication as the satellite antenna slides through a continuum of positions.

The ability to maintain low-loss communication at all times while a satellite antenna is moved throughout a continuum of positions is important to quick and efficient use of a satellite mobile radio (or satellite telephone), or other mobile radio. If communication is degraded heavily during repositioning of the satellite antenna, communication between the satellite telephone and a satellite station or base station may be lost completely requiring a caller to reinitiate a telephone call. Such degraded performance or a design causing disconnection of the satellite antenna during repositioning is clearly problematic and inefficient.

There is a current need in the industry of antenna design for an improved design for a continuously low-loss connection with a satellite antenna. Solutions developed for connecting cellular antennas cannot be used as they are far too lossy for satellite applications.

Non-satellite antennas, such as conventional cellular antennas generally have a simpler structure than do conventional satellite antennas. A typical cellular antenna consists of a linear conductive member. Thus, connecting a simple antenna such as a cellular antenna through a slidable connection does not present as many challenges as does connecting a satellite antenna thereto. The reason for this is the complexity of the satellite antenna.

A conventional satellite antenna consists of more than just one wire. For example, a quadrafiler helix (QFH) satellite antenna consists of pairs of conductive windings around a cylindrical shell in a helix geometry. Because the satellite antenna is a bundle of wires wound in a helix (with each wire or group of wires requiring a separate connection) rather than a single conductive member, a single sliding connection cannot be effected as in a cellular environment.

For example, in the case of four (4) pairs of wires wound into a helix spiraling around the cylindrical shell of the antenna, a connection must be made to all of four (4) pairs of helix-wound wires. So, as the satellite antenna slides the connection must be made with specific varying points on the Quadrafiler Helix (QFH) satellite antenna. That is, four (4) such pairs of helix-wound wires create eight (8) windings all at different locations of the cylindrical shell at any given length of the satellite antenna.

Therefore, the satellite antenna cannot connect slidably in the satellite telephone as does a cellular antenna in a cellular telephone, and a different solution must be achieved. The problem is thus to make an low-loss electrical connection to a static mobile radio with a sliding antenna, whether the sliding antenna be a cellular antenna, a satellite antenna, or some combination of both.

This problem is also especially peculiar to satellite antennas because a satellite communication system can tolerate a lesser amount of signal losses than a cellular communication system can tolerate. A high-loss system is particularly problematic in satellite telephones because of a limited loss budget. In order to make up this loss on the satellite side, e.g., by building a more sophisticated satellite, extremely high costs would be involved.

The applicants are currently unaware of any prior art to the slidable connection taught herein by the Applicants. The applicants are also unaware of any publically available designs or mobile radio products achieving a near loss-less slidable connection to a satellite antenna.

However, an alternate, less effective, method of achieving the near loss-less slidable connection by a mobile radio to the satellite antenna is currently under development by the Applicants using cables attached to a single basal connection point on the satellite antenna for the pairs of helix-wound wires. A cable is connected at one end to each of the basal connection points and at another end to a printed circuit board of the satellite telephone. Such a prototype handset, under development by Hughes Network Systems (HNS) is called "Thuraya" and has not yet been publically exploited.

Though the use of cables in a slidable connection for the satellite antenna is mechanically reliable, it is inherently clumsy, difficult and expensive to manufacture or repair because of costs and time involved with manual assembly. There are many costs involved with manually assembling the cables into the satellite telephone. Additionally, a cabled connection is not easily disconnected to enable re-connection of the satellite telephone to another antenna system.

More losses are also inherent in the use of the cable as compared to the instant invention, and increase with the length of the cable. In general, an embodiment of the instant invention would likely achieve a 0.2 dB to 0.3 dB increase in performance over the use of cables for the slidable connection.

Another way to achieve more than one position in connecting the satellite antenna to the transceiver is to set two satellite antenna positions via a swivel antenna using a shoulder joint. Unfortunately, this does not solve the problem of maintaining a continuous connection while sliding the satellite antenna from a retracted to an extended position.

The present invention advantageously addresses the above and other needs.

SUMMARY OF THE INVENTION

The present invention advantageously addresses the needs above as well as other needs by providing a low-loss slidable connection of an antenna to a mobile radio.

In one embodiment, the invention can be characterized as a system for connection of an antenna to a mobile radio. The system comprises: an antenna element and at least one antenna contact at a basal end thereof; and at least one slide strip, slidably coupled with the at least one antenna contact when the antenna assembly is in a plurality of retracted positions, the at least one slide strip being coupled to a transceiver in the mobile radio and conducting radio-frequency signals to maintain communication with the mobile radio.

In a variation, a method for slidable connection of an antenna to a mobile radio comprises the steps of: providing an antenna element and at least one antenna contact at a basal end thereof; providing at least one slide strip coupled to a transceiver and configured to be slidably coupleable with the at least one antenna contact; sliding the antenna element into a plurality of retracted positions and connecting the at least one antenna contact with the at least one slide strip, wherein the antenna element maintains a connection to the transceiver while sliding through the plurality of retracted positions.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
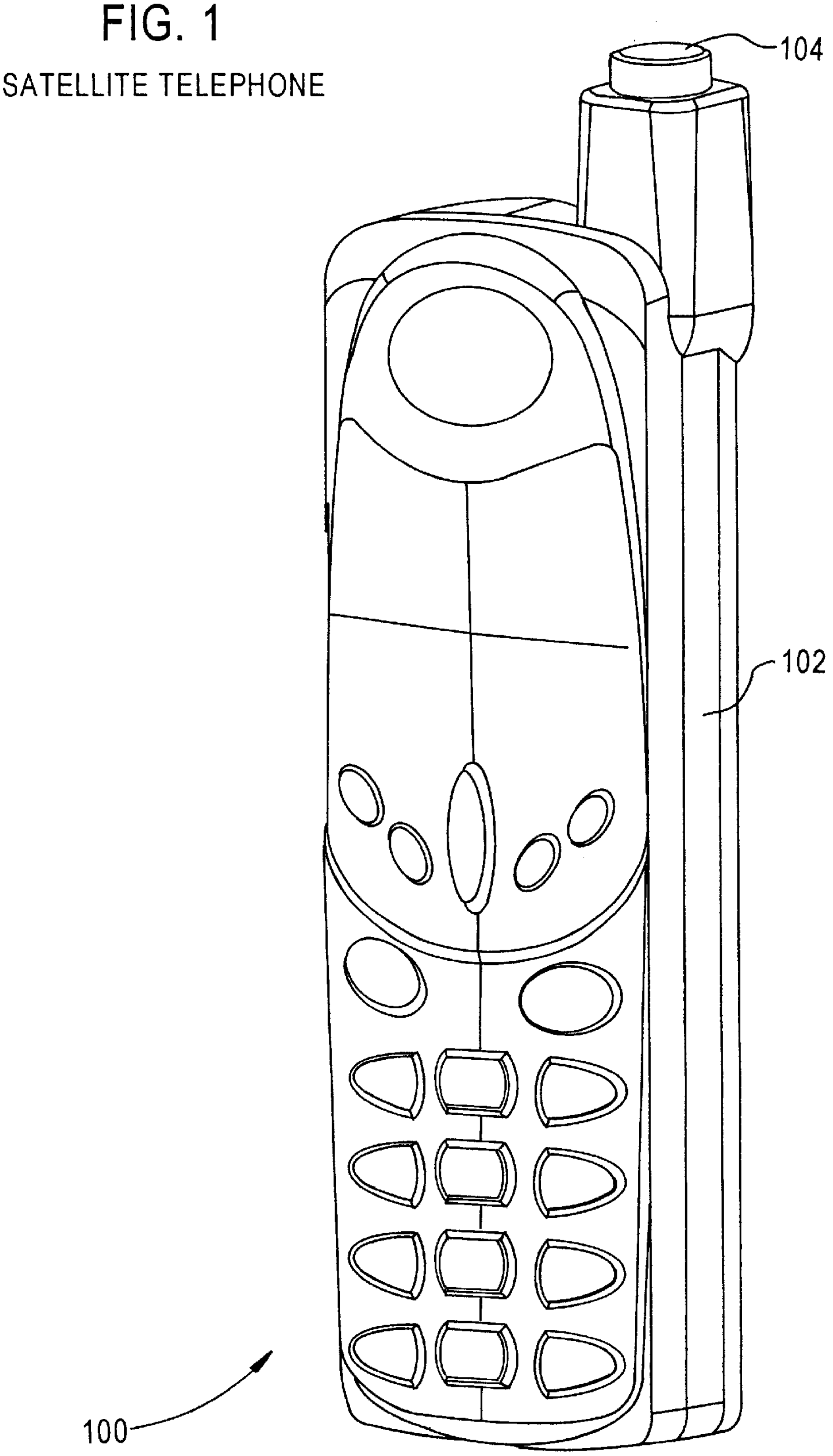
FIG. 1 is a perspective view of a satellite mobile radio (or satellite telephone)

Referring first to FIG. 1, a perspective view of one embodiment of a mobile radio 100 (or "satellite telephone" 100) is shown that can maintain continuous communication through a slidable connection between a satellite antenna and a transceiver. The satellite telephone 100 further comprises a telephone housing 102 through which an antenna cap 104 protrudes.

Figures 2A, 2B, 2C:
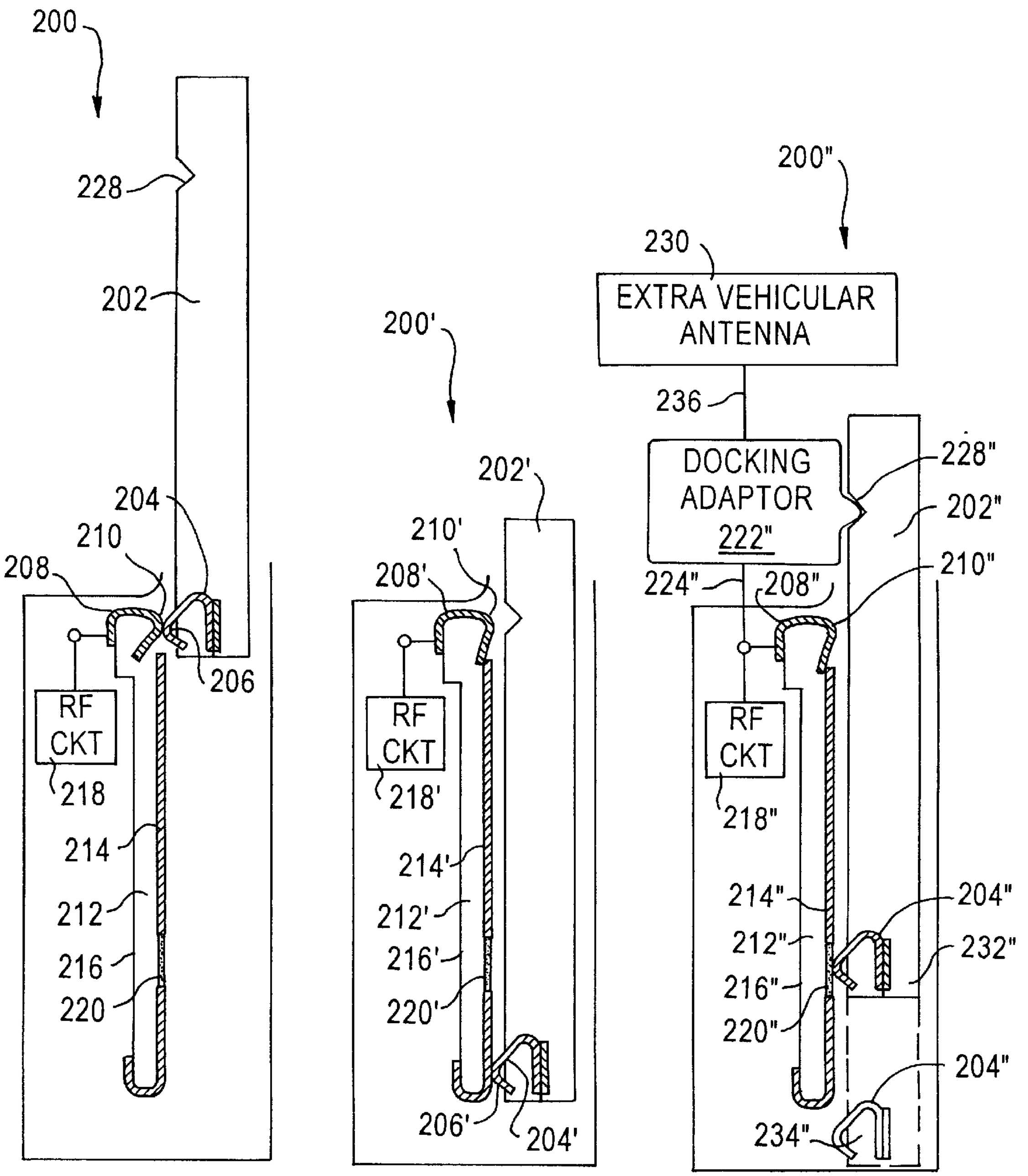
FIG. 2A is a front view of a satellite antenna, such as illustrated in FIG. 1, in an extended position as it would appear during normal use.
FIG. 2B is a front view of a satellite antenna, such as illustrated in FIG. 1, in one of a continuum of retracted positions, such as it would appear during standby.
FIG. 2C is a front view of a satellite antenna, such as illustrated in FIG. 1, illustrating two possible placements for disconnection of the satellite antenna as it would appear during docking.

The satellite telephone 100 has three modes of operation which are illustrated by FIGS. 2A–C.

Referring next to FIG. 2A, in one mode of operation, an extended satellite antenna 202 is connected directly through an antenna contact 204 and a switch 208 to a transceiver 218, thus controlling signal losses by minimizing any additional signal losses that could occur from connection to unnecessary hardware. In another mode of operation a retracted satellite antenna 200' shown in FIG. 2B is connected through, not only an antenna contact 204' and a switch 208', but also through a slide strip 212' which is designed to minimize signal losses through the slide strip 212' as the antenna contact 204' assumes various continuous positions along the length of the slide strip 212'. In yet another mode of operation shown in FIG. 2C a docked satellite antenna 200" is docked in or more positions to disconnect the docked satellite antenna 202" from a transceiver 218" so that the transceiver 218" is free to connect to an extravehicular antenna 230", if desired, without electrical connection to unnecessary hardware, i.e., the slide strip 212' and switch 208'. These modes of operations of the satellite telephone 100, FIGS. 2A–C, are described below.

Referring again to FIG. 2A, a side view is shown of the mobile radio 200 (or satellite telephone 200) of FIG. 1, as it would appear in an extended position, (or extended mode of operation). The satellite telephone 200 comprises the satellite antenna 202; the antenna contact coupled thereto; a slide strip 212 comprising a conductor 214 wrapped around an insulator; the switch 208 in an open position; and the transceiver (or "radio frequency (RF) circuit") 218.

The antenna contact 204 is at a basal end of the satellite antenna 202 and has a protruding section 206 that switchably couples with a protrusion 210 of the switch 208 facing the protruding section 206 of the antenna contact 204 when the extended satellite antenna 202 is in the extended position. An end portion of the switch 208 is (either fixedly or switchably) coupled to the transceiver, or radio frequency (RF) circuit 218. In such a configuration, the satellite antenna 202 is coupled to the transceiver 218 while also being disconnected from the slide strip 212 in order to minimize additional losses due to signal propagation through the slide strip 212.

Referring again to FIG. 2B, a side view is shown of the satellite telephone 200 as it would appear in, for example, one of a continuum of retracted positions. The satellite telephone 200 comprises an antenna contact 204' at a basal end of a satellite antenna 202'; a slide strip 212' further comprising a conductor 214' wrapped around an insulator 216'; a switch 208' with a protrusion 210'; and a transceiver (or radio frequency (RF) circuit) 218'.

The switch 208' is switchably coupled at an end to the slide strip 212' when the satellite antenna 202' is in one of the continuum of retracted positions. The switch 208' is (fixedly or switchably) coupled at another end to the transceiver 218'.

When the satellite antenna 202' is moved from the extended position as shown by FIG. 2A to one of the continuum of retracted positions, the antenna contact 204' decouples from the protrusion 210' of the switch 208' and couples with the slide strip 212' instead. This decoupling and coupling can occur swiftly or simultaneously depending on a design of the satellite telephone 100.

Alternatively, when the satellite antenna 202' slides from one retracted position to another retracted position, the switch 208' stays coupled to the slide strip 212' and the antenna contact 204' stays coupled to the slide strip 212', thus maintaining electrical connection between the satellite antenna 202' and the transceiver 218'.

Referring next to FIG. 2C, a side view of the satellite telephone 100 as it would appear in two of several possible selected docked positions is shown.

The satellite telephone 100 comprises an antenna contact 204" at a basal end of a satellite antenna 202"; a slide strip 212" comprising a conductor 214" wrapped around an insulator 216", and an insulator portion 220" within the conductor 214"; a switch 208"; and a transceiver 218".

In one docked position, the satellite antenna 202 is in an intermediate docking position 232" wherein an antenna contact 204" meets the insulator portion 220" of the slide strip 212". In an alternate docking position 234", the satellite antenna 202" is in a position past a bottom of the slide strip 212".

In one embodiment, irrespective of where the satellite antenna 202" is docked, the switch 208" remains switchably coupled at an end to the slide strip 212" when the satellite antenna 202" is docked. However, the slide strip 202" is decoupled from the antenna contact 204" when the satellite antenna 202" is docked.

In another variation, a docking adaptor 222" is used to dock the satellite antenna 202" using a cam feature 226" of the docking adaptor 222" fitting into a cam notch 228" of the satellite antenna 202". The docking adapter 222" and method for docking therewith is described in detail herein below in reference to FIGS. 8A and 8B.

In summary, the docking adaptor 222" is at one end electrically coupled via a docking interface 224" to the transceiver 218" of the satellite telephone 100 and at another end electrically coupled to an extravehicular antenna 230" via an extravehicular interface 236", thereby coupling the transceiver 218" to the extravehicular antenna 230" while the docked satellite antenna 202" is disconnected from the transceiver 218". In such a mode, the transceiver 218" may be used with the extravehicular antenna 230" quite efficiently.

Figure 3:
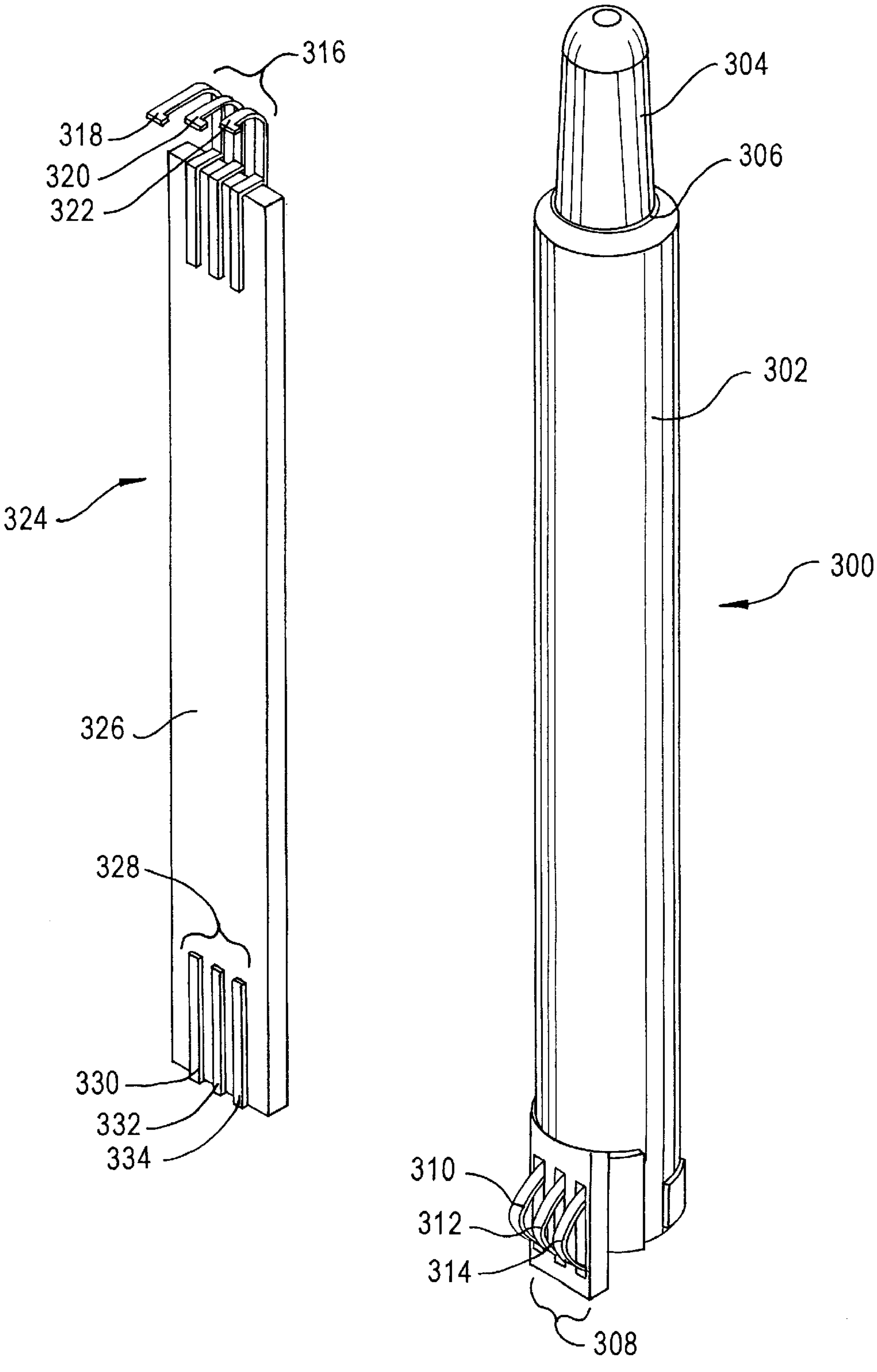
FIG. 3 is a perspective view of a satellite antenna in alignment with a polyamide body such as may be used in the embodiments of FIGS. 1, and 2A–C.

Referring next to FIG. 3, a perspective view of a strip subassembly 324 is shown in configuration with a satellite antenna 300. The satellite antenna 300 comprises an antenna radome 302; an antenna cap 304; a cam notch 306 between the antenna cap 304 and the antenna radome 302; and three (3) antenna contacts 308 at a basal end of the satellite antenna 300.

The stip subassembly 324 is composed of three (3) conductive strips 330, 332, 334 wrapped around an insulator 326. The conductive strips 330, 332, 334 are made of nickel (Ni) in accordance with one embodiment.

In one embodiment of the invention, a length of the conductive strips 330, 332, 334 are selected to minimize losses due to reflective radio frequency energy caused by mismatch at a connection of the antenna contacts 308 to the conductive strips 330, 332, 334. In this case, the length (or electrical path) of the conductive strips is an integer number of half wavelengths, so that an open circuit is presented at the protruding section 206'.

In another embodiment (shown later in FIG. 5) the conductive strips 330, 332, 334 are composed of nickel (Ni) and a gold (Au) coating (shown in FIG. 5) is placed over the conductive strips 330, 332, 334. In yet another embodiment (not shown) a gold (Au) coating is placed only over selected portions (not shown) of the conductive strips 330, 332, 334 to increase conductivity at the selected portions. The selected portions can be arbitrary or strategically selected in accordance with principals of antenna design known by a skilled artisan in the field of antenna design.

A cross section of the strip subassembly 324 is later shown in FIG. 5. Three (3) switches 316 are shown in FIG. 3 as they couple to the three (3) conductive strips 328.

Three switches 316 comprise a ground switch 322, a cellular switch 320 and a satellite switch 318. The three conductive strips 328 comprise a ground strip 334; a cellular strip 332 and a satellite strip 330. The three antenna contacts 308 similarly comprise a ground contact 314; a cellular contact 312; and a satellite contact 310.

The ground contact 314 connects the ground strip 334 to a ground (not shown); the cellular contact 312 connects the cellular antenna (inside the radome, not shown) to the cellular strip 332; and the satellite contact 310 connects the satellite antenna (inside the radome, not shown) to the satellite strip 330. The three switches 316 move in unison depending upon their contact with the three antenna contacts 308, to either connect or disconnect the three switches 316 from the three conductive strips 328, and to connect or disconnect the three switches 316 from the three antenna contacts 308, as previously shown by FIGS. 2A–C.

The strip subassembly 324, switches 316 and the satellite antenna 300 are shown in greater detail in the following figures and accompanying descriptions thereof.

Figure 4:
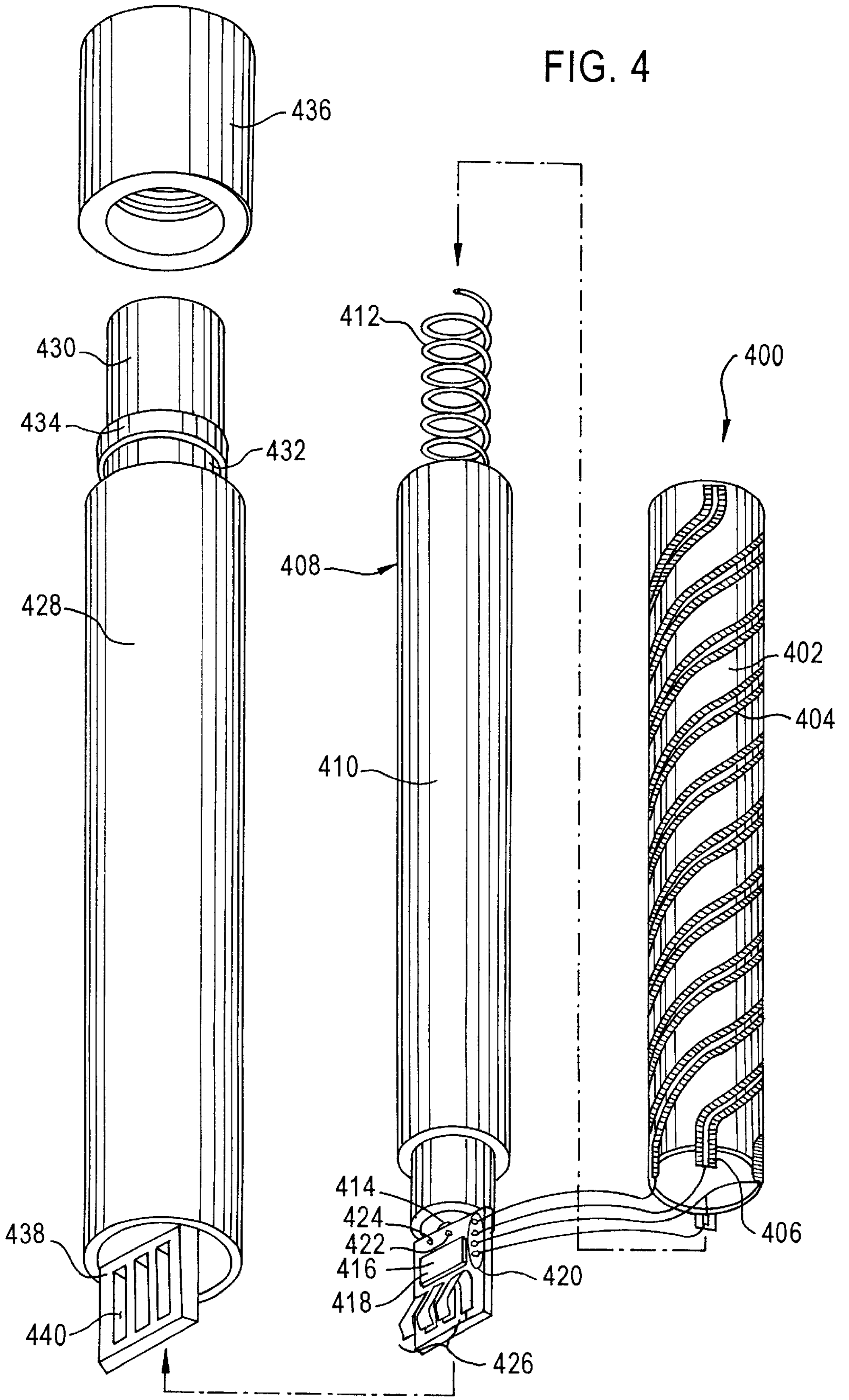
FIG. 4 is an exploded perspective view of the satellite antenna of FIG. 3, illustrating how several layers of the satellite antenna fit together: a cellular antenna element, a satellite antenna element, an antenna radome, and an antenna cap.

Referring next to FIG. 4, an exploded perspective view is shown of one embodiment of the satellite antenna 300 of FIG. 3 which could be used with the satellite telephone 100 of FIG. 1.

The satellite antenna 300 also comprises four distinct removable elements: a cellular antenna element 408; a satellite antenna element 400; an antenna radome 428; and an antenna cap 436.

The satellite antenna element 400 is a Quadrafiler Helix (QFH) antenna which comprises a satellite shell 402 of cylindrical shape having a diameter D and four (4) pairs of helix-wound wires 404 wrapped around the satellite shell 402 to compose a Quadrafiler Helix (QFH) antenna which is the satellite antenna element 408. The four (4) pairs of helix-wound wires 404 meet at a basal end of the satellite shell 402 to form four (4) Quadrafiler Helix contact points (or "satellite wires") 406, one wire for each pair.

The cellular antenna element 408 further comprises: a cellular shell 410 of a diameter $D_2$; a cellular antenna cable 414; a cellular coil 412; and a phasing/impedance matching circuit ("matching circuit") 418 on a printed circuit board (PCB) 416.

The cellular shell 410 has a slightly smaller diameter $D_2$ than does the satellite shell 402. The cellular shell 410 of diameter $D_2$ surrounds the cellular antenna cable 414 that passes through an aperture formed within the cellular shell 410 along an axis of the cellular shell 410. One end of the cellular antenna cable 414 comprises a cellular coil 412 that extends past the cellular shell 410. The matching circuit 418 has a cellular input 422, four satellite inputs 420 (one for each pair of helix-wound satellite wires), and a ground input 424.

A basal end of the cellular antenna cable 414 comprises a cellular wire (shown in a later figure) coupled to the cellular input 422 of the matching circuit 418. The four (4) helix-wound satellite wires 404 are also coupled to the four (4) satellite inputs 420 of the matching circuit 418. The ground (not shown) is also coupled at the ground input 424 of the matching circuit.

The Printed Circuit Board (PCB) 416 containing the matching circuit also holds the three (3) antenna contacts 426 on one surface. The antenna contacts 426 may be spring contacts. The PCB 416 extends past the basal end of the cellular shell 410 and protrudes from the antenna radome 428 when integrated.

The cellular antenna element 408 fits inside the satellite antenna element 400 in a close concentric stacking arrangement. The satellite antenna element 400 can be integrated with the cellular antenna element 408 by fitting the basal end of the satellite antenna element 400 over a top end of the cellular shell 410 since the diameter D of the satellite shell 410 is slightly larger than the diameter D2 of the cellular shell 410.

The antenna radome 428 is an outer cylindrical shell fitting over the satellite shell 402. The antenna radome 428 has a diameter $D_3$ slightly larger than the diameter of the satellite shell 402, D. The antenna radome 428 further comprises a radome neck 430 at one end of the antenna radome 428 and a contact fitting 438 at a basal end thereof. The radome neck 430 further comprises a raised annular feature 434.

The antenna cap 436 is flexible and can grasp the raised annular feature 434 on the radome neck 430 to secure the antenna cap 436 to the antenna radome 428.

The antenna cap 436 can be snapped onto the raised annular feature 434 as well. Once the antenna cap 436 is placed over the radome neck 430, a cam notch 432 is exposed between the antenna cap 436 and the antenna radome 428. The purpose of the cam notch 432 will be explained later herein in connection with a docking adapter described in reference to FIGS. 8A and 8B. The contact fitting 438 is also coupled at a basal end of the antenna radome 428, through which the antenna contacts 426 may protrude.

In practice, to integrate the antenna radome 428 with the satellite shell 402 and the cellular shell 410, the satellite shell 402 and the cellular shell 410 are first stacked (as "stacked shells"), and the stacked shells are slipped through the basal end of the antenna radome 428 until the cellular coil 412 protrudes into the radome neck 430. When integrated, the three (3) contacts 426 on the PCB protrude through three apertures 440 in the contact fitting 438 on the antenna radome 428.

When the stacked shells are integrated into the antenna radome 428, the cellular antenna element 408 receives and radiates radio frequency (RF) signals through the cellular coil 412, and the satellite antenna element 408 receives and radiates (RF) signals through the pairs of helix-wound wires 404. The satellite antenna element 400 and the cellular antenna element 408 do not interfere with each other in this configuration, electrically or magnetically (i.e., with EMI).

The matching circuit 418 operates by transforming the four (4) satellite inputs 420, the ground input 424 and the cellular input 422 into, respectively, a matched satellite output, a matched ground output and a matched cellular output which is transmitted through the antenna contacts 426 to the transceiver 218' in a manner described and shown by FIGS. 2A–C.

Figure 5:
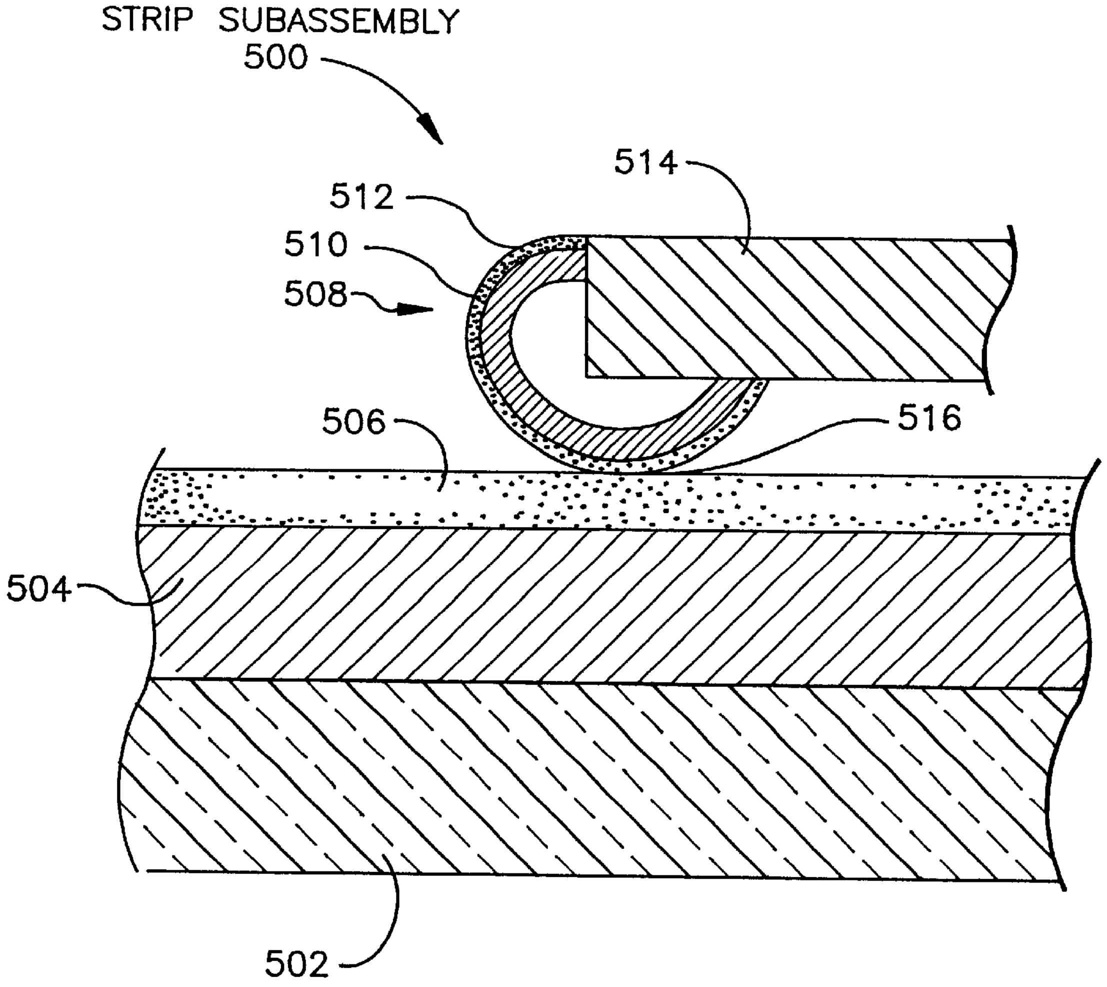
FIG. 5 is a partial cross-sectional view of the polyamide body of FIG. 3 with a conductive stip and insulator as the polyamide body appears in contact with an antenna contact of the satellite antenna of FIG. 3.

Referring next to FIG. 5, a cross section through a strip subassembly 500, such as shown by FIG. 3, coupled to an antenna contact 508 is shown demonstrating several layers of materials used in one embodiment.

The strip subassembly 500 comprises an insulator 502 of rectilinear dimensions wherein a length is longer than a width. The insulator 502 is a polyamide body, or a polyamide. A polyamide is a compound containing one or more amide radicals or polymer amides.

A conductive strip 504 of nickel (Ni) is deposited over the insulator 502. A gold (Au) coating 506 is deposited over the conductive strip 504 to enhance conductivity of signals passing through the strip subassembly 500. The gold (Au) coating 506 may be placed over the entire length of the conductive strip 504, or it may be placed at selected locations, either arbitrary or strategically selected under known principals of antenna design. A skilled artisan will recognize that gold may be replaced by several other conductive metals to obtain a similar result.

The antenna contact 508 comprises a nickel (Ni) contact 510 that has a contact gold (Au) coating 512 and is attached to a phasing/impedance matching circuit (matching circuit) 514. The nickel (Ni) contact 510 has a protruding section 516 to touch the gold (Au) coating 506 at one or more points thereon. The gold-to-gold contact resulting therefrom results in higher conductivity of the signals passing from the nickel (Ni) contact 510 to the strip subassembly 500.

Figure 6A:
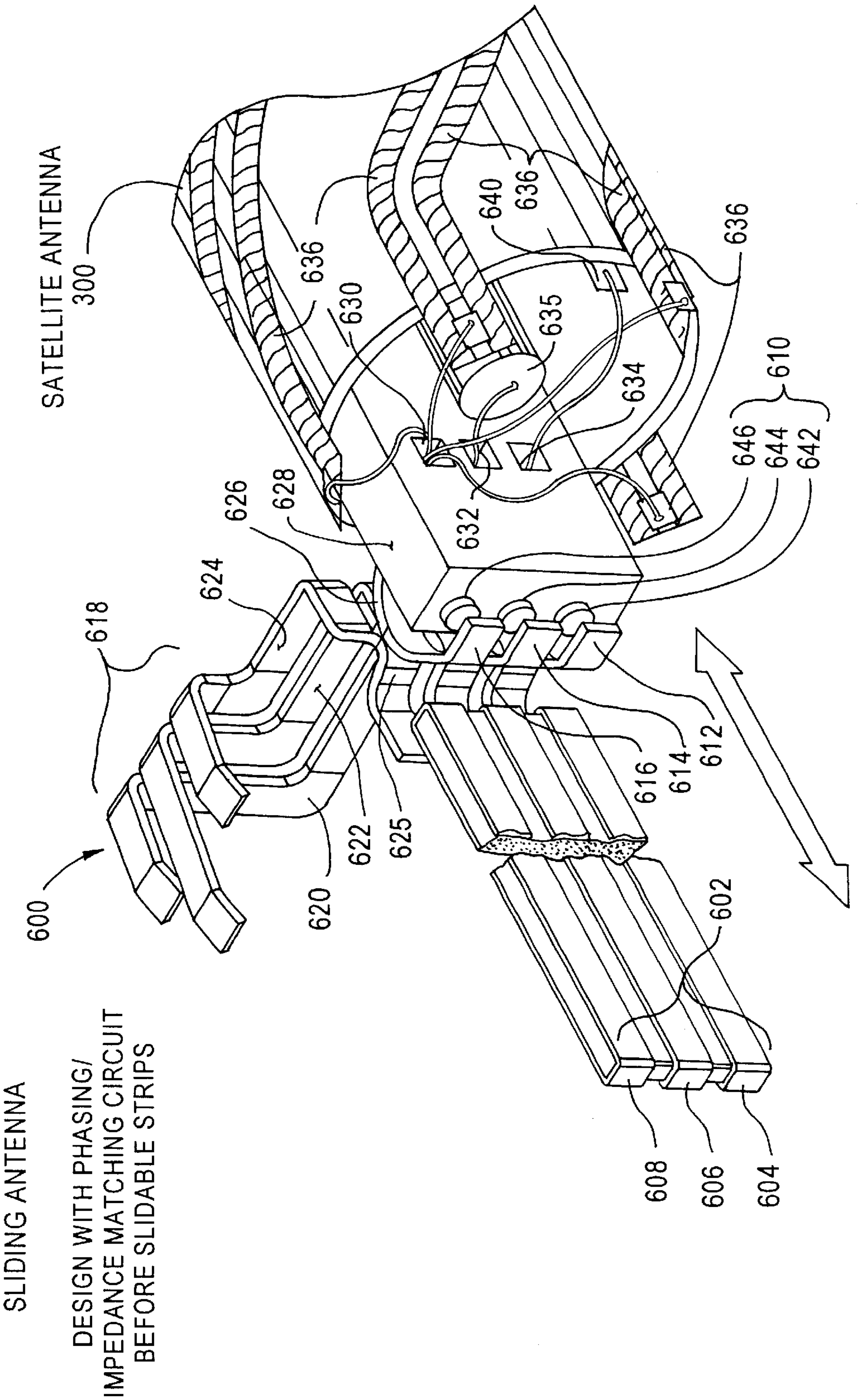
FIG. 6A is a perspective view of a sliding antenna, such as shown by FIG. 4, three switches, three sliding contacts and a phasing and impedance matching circuit board on the sliding antenna.

Referring next to FIG. 6A, a perspective view is shown of one embodiment of a sliding antenna 600 design integrated with three (3) slide strips 602, three (3) antenna contacts 610 and three (3) switches 618, wherein a phasing/impedance matching circuit (matching circuit) 628 is placed before the slide strips 602, i.e., moves with the sliding antenna 600.

The three (3) slide strips 602, such as shown and described already by FIG. 3, are shown configured as they would appear when the satellite antenna 100 is in an extended position such as shown by FIG. 2A. The three (3) slide strips 602 correspond respectively (as shown also by FIG. 3) to a ground strip 608, a cellular strip 606 and a satellite strip 604. Three corresponding antenna contacts 610 also comprise a ground contact 616, a cellular contact 614, and a satellite contact 612.

The three antenna contacts 610 are switchably coupled, depending on a mode of the satellite antenna 300, to three (3) switches 618 that comprise a ground switch 624, a cellular switch 622, and a satellite switch 620. The three switches 610 disengage from the three slide strips 602 when a protrusion 625 in each of the switches 618 meets with a protruding section 626 of each respective protruding section 626 of each of the antenna contacts 610 and rotates each of the switches 618 away from each of the three slide strips 602.

Alternately, in a retracted position, each of the antenna contacts 610 is in contact with respective slide strips 602 and each of the switches 618 is not rotated away from each of the slide strips 602, but rather is in contact therewith.

The phasing/impedance matching circuit ("matching circuit") 628 is placed between the satellite antenna 100 and the antenna contacts 610. The matching circuit 628 is on a printed circuit board (PCB) and has four (4) satellite inputs 630, a ground input 634 and a cellular input 632. The satellite antenna has four (4) satellite wires 636 connecting to the four (4) satellite inputs 630, a cellular wire 638 fitting to the cellular input 632 and a ground fitting 640 to the ground input 634. The matching circuit 628 returns a matched satellite output, a matched cellular output and a matched ground output to the three antenna contacts 610 through, respectively, a satellite output 642, a cellular output 644, and a ground output 646.

Figure 6B:
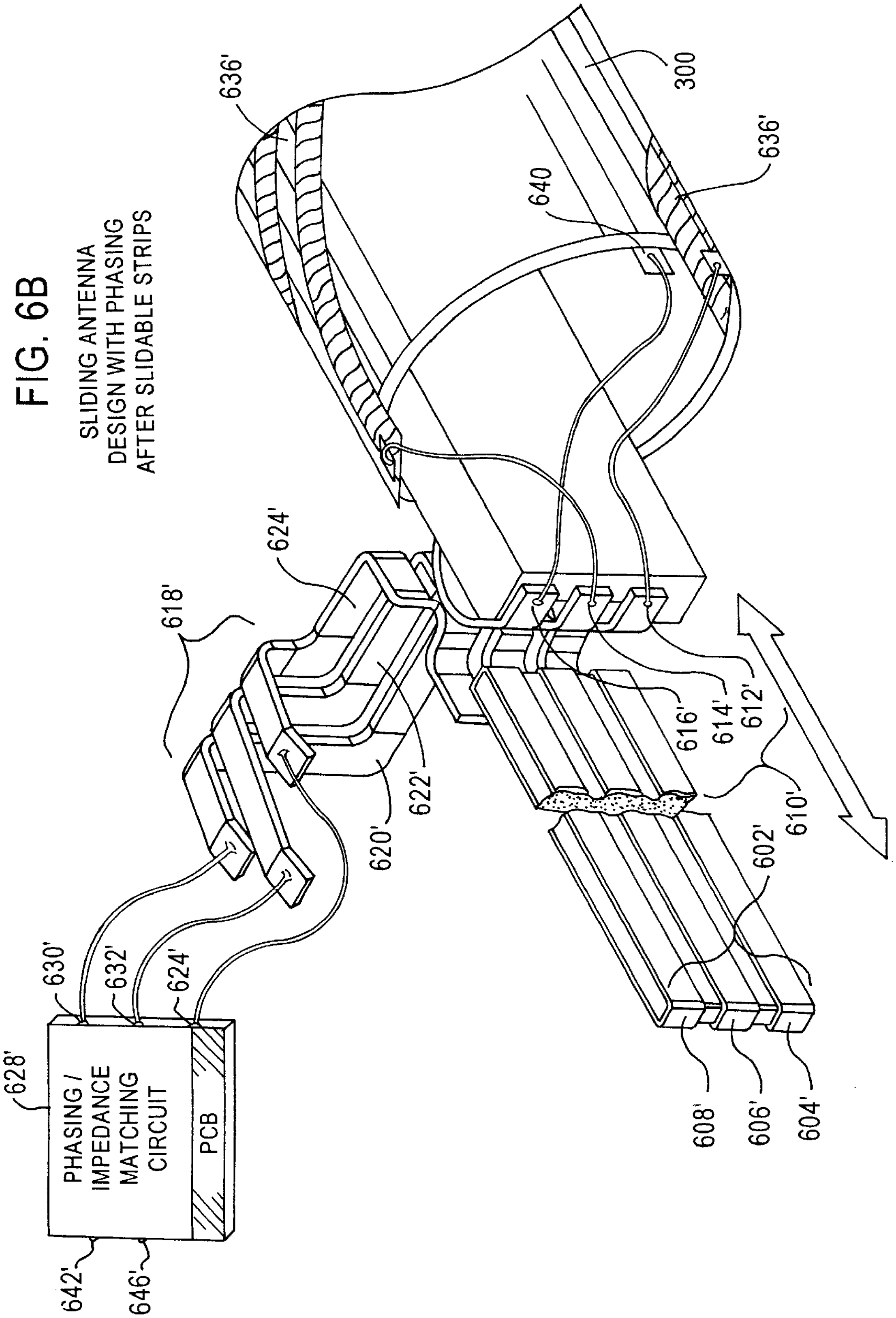
FIG. 6B is a perspective view of another embodiment of a sliding antenna of FIG. 4 wherein a phasing and impedance matching circuit board is placed in contact with three switches.

FIG. 6B is a perspective view of an analogous sliding antenna design to FIG. 6A, except that a phasing/impedance matching circuit ("matching circuit") 628' is placed after three (3) switches 618', i.e., the phasing/impedance matching circuit 628' remains stationary, with the satellite telephone housing. A skilled artisan will recognize many other conceivable placements of the matching circuit 628' achieving a similar result. In all cases a plurality of satellite inputs are reduced into one (1) satellite input also reducing respective communication lines thereafter.

The matching circuit 628' comprises a ground input 634', two satellite inputs 630', 632', a ground output 646', and a satellite output 642'. The matching circuit 628' receives the two (2) satellite inputs 630', 632' and the ground input 634' and returns matched satellite signals and a matched ground signal via the satellite output 646' and the ground output 642'. Also, similarly, the three switches 618' comprise a ground switch 624' and two (2) satellite switches 620', 622' that are aligned with the ground input 634' and the two (2) satellite inputs 632', 630'.

Similarly, the three slide strips 602' correspond to a ground strip 608' and two (2) satellite strips 606', 604' and are aligned at one end with the ground switch 624' and the two (2) satellite switches 620', 622'; and aligned at another end with a ground contact 616' and two (2) satellite contacts 614', 612'. The ground contact 616' is aligned with a ground 640 while the satellite contacts are aligned with the two (2) satellite wires 636'.

Figure 7:
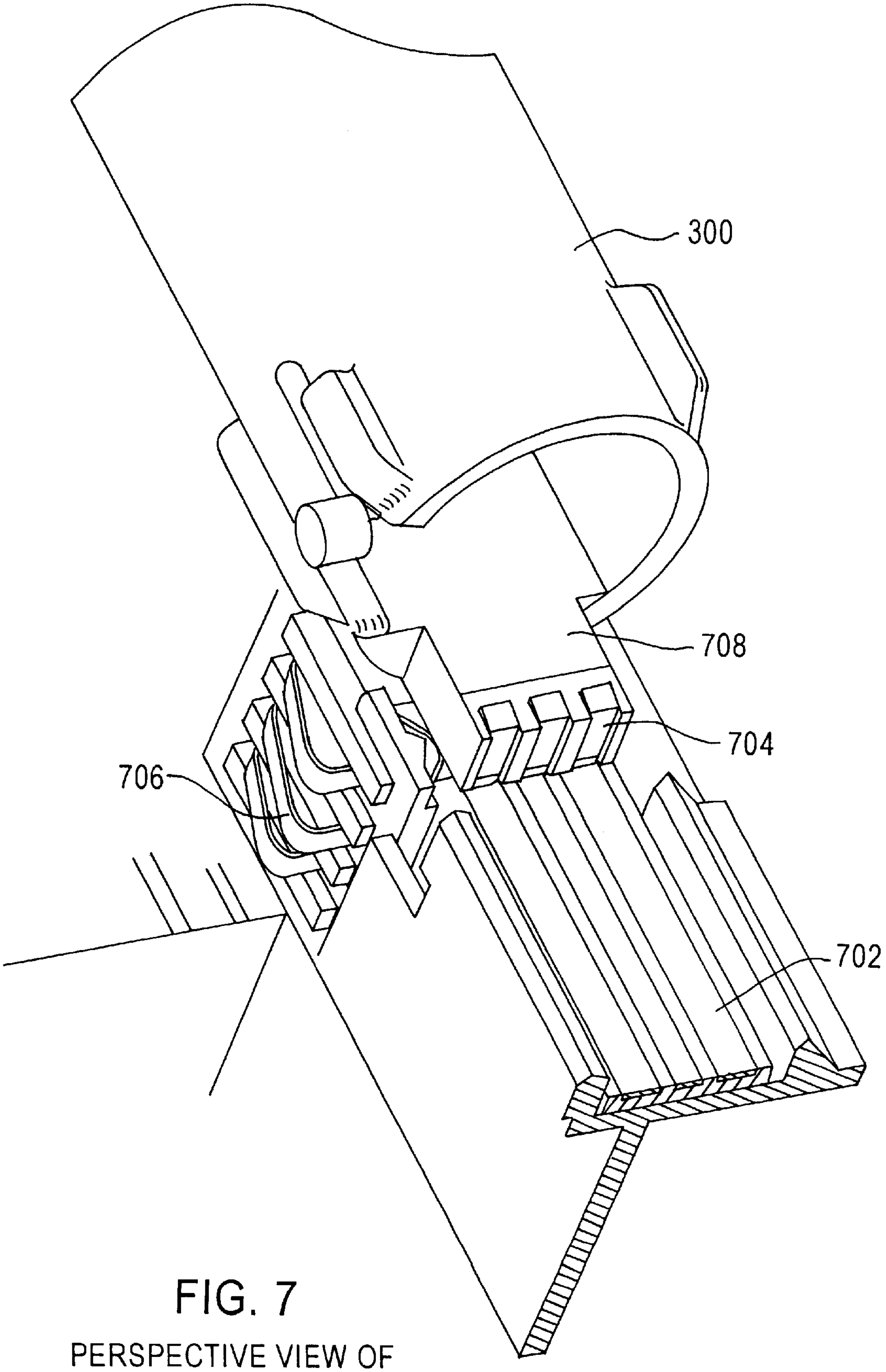
FIG. 7 is a perspective view of the sliding antenna of FIG. 6A, integrated into the satellite telephone of FIG. 1.

Referring next to FIG. 7, a perspective view is shown of the satellite antenna 300 shown in FIG. 6A, when the satellite antenna is in a retracted position. The satellite antenna 300 is configured with three slide strips 702, three antenna contacts 704 and three switches 706, wherein a phasing/matching circuit ("matching circuit") 708 on a printed circuit board (not shown) is placed in connection with the three antenna contacts 704 as in FIG. 6A.

In an alternate embodiment, the mobile radio or satellite telephone 100 may also be used in conjunction with an extravehicular antenna, by employing a docking adaptor such as demonstrated by FIG. 2C, schematically.

Either the intermediate docking position or the alternate docking position shown in FIG. 2C can be achieved by using a docking adaptor.

Figure 8A:
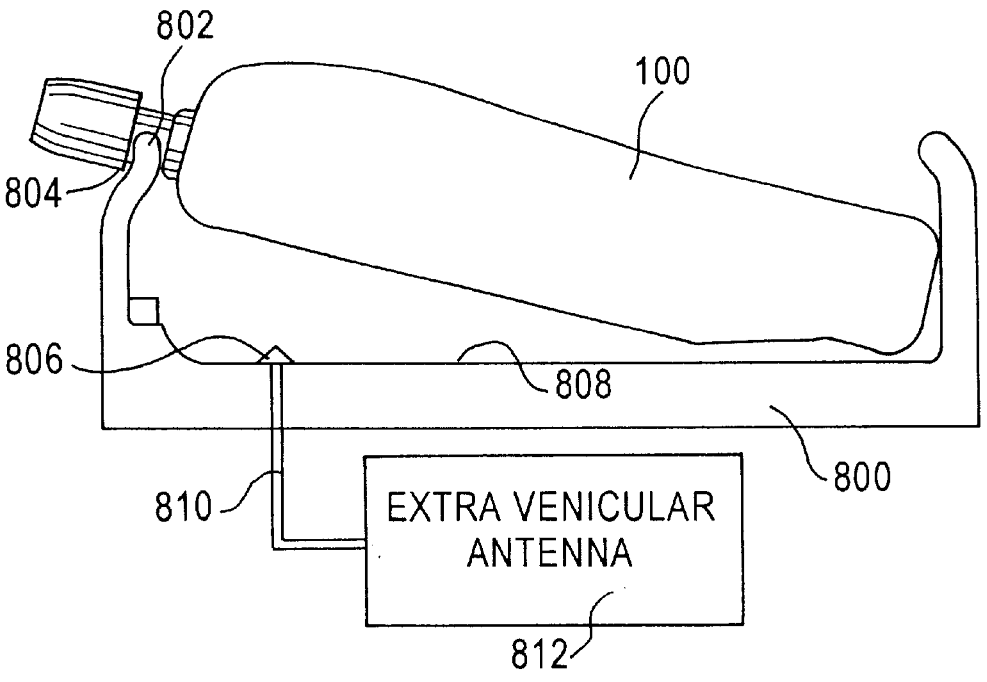
FIG. 8A is a side view of a mobile radio such as is shown in FIG. 1 being docked into a docking adaptor wherein a cam feature in the docking adaptor matches with a cam notch on an antenna of the mobile radio (or satellite telephone) to slide the antenna into a docking position.

Referring next to FIG. 8A, the satellite telephone 100 is shown as it is placed into the docking adaptor 800 by lining up a cam feature 802 on the docking adaptor 800 with a cam notch 804 on the satellite antenna 300. As the satellite telephone 100 is placed into the docking adaptor 800 the cam notch 804 slides along the cam feature 802 and the satellite antenna 300 slides into one of two docked positions as shown by FIG. 2C, either the intermediate docking position 232", or the alternate docking position 234". An antenna docking connector 806 on a basal interior surface 808 of the docking adaptor 800 is used to connect the satellite telephone 100 to a docking interface 810 which may be electrically connected to an extravehicular antenna 812 for use with the satellite telephone 100.

Figure 8B:
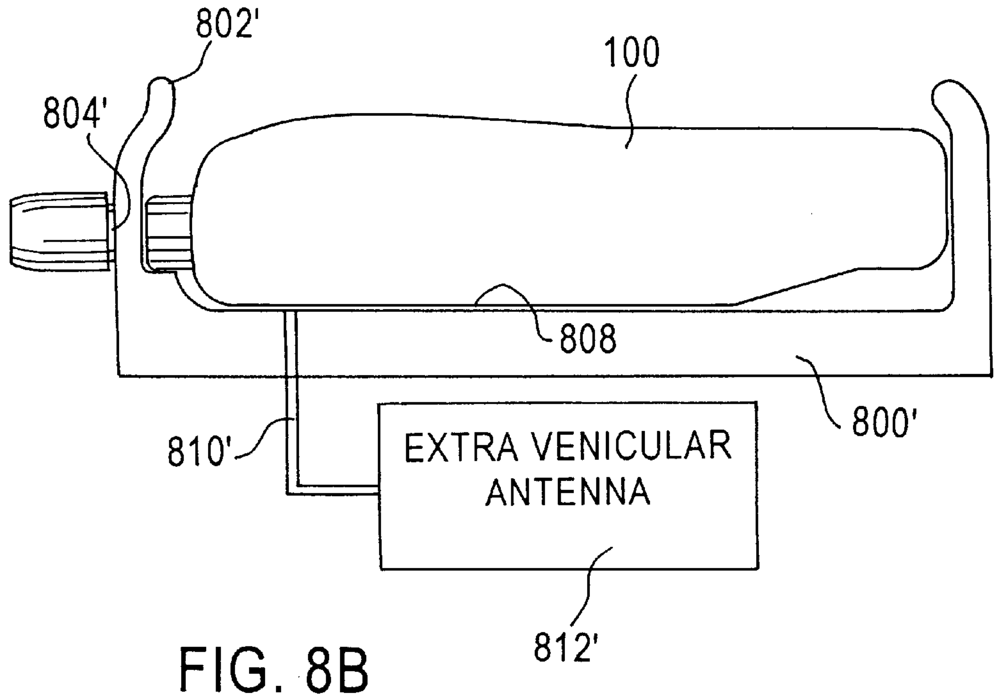
FIG. 8B is a side view of the mobile radio (or satellite telephone) of FIG. 1 fully docked in the docking adaptor of FIG. 8A and connected to an extravehicular antenna.

Referring next to FIG. 8B, a satellite telephone 100 in a final docked position in a docking adaptor 800' is shown. When the satellite telephone 100 is fully inserted into the docking adaptor 800', the satellite antenna 300 is disconnected and the transceiver of the satellite telephone 100 is electrically connected to the docking adaptor 800' through a docking interface 810'. The docking adaptor 800' is electrically coupled to an extravehicular antenna 812' which is coupled to the transceiver through the docking adaptor 800'. In this manner, the extravehicular antenna 812' may be used with the satellite telephone 100 while the satellite telephone 100 is docked.

While the invention herein disclosed has been described by means of specific embodiments and applications thereof, numerous modifications and variations could be made thereto by those skilled in the art without departing from the scope of the invention set forth in the claims.

What is claimed is:

1. A system for the slidable connection of a satellite antenna to a mobile radio comprising:

an antenna including a single retractable antenna element and at least two antenna contacts coupled thereto wherein the antenna contacts retract with the antenna element;

and at least two slide strips, slidably coupled respectively to the at least two antenna contacts when the single retractable antenna element is in a plurality of retracted positions, the at least two slide strips being coupled to a transceiver in the mobile radio and conducting radio-frequency frequency signals to maintain communication with the mobile radio; and at least two switches coupled to the transceiver and switchably coupled respectively to the at least two slide strips wherein:

when the single retractable antenna element is moved to a plurality of retracted positions, the switches and the at least two antenna contacts are coupled to the at least two slide strips to maintain electrical connection between the transceiver and the antenna;

and when the single retractable antenna element is moved to an extended position, the switches decouple from the at least two slide strips and couple to the at least two antenna contacts so as to maintain electrical connection between the transceiver and the antenna.

2. A system for the slidable connection of a satellite antenna to a mobile radio comprising:

an antenna including a single retractable antenna element and at least two antenna contacts coupled thereto wherein the antenna contacts retract with the antenna element; and and at least two slide strips, slidably coupled respectively to the at least two antenna contacts when the single retractable antenna element is in a plurality of retracted positions, the at least two slide strips being coupled to a transceiver in the mobile radio and conducting radio-frequency signals to maintain communication with the mobile radio;

wherein the at least one slide strip has a selected length determined according to an amount of reflective radio-frequency losses along the slide strip at the selected length.

3. The system of claim 2 wherein the selected length is an integer number of half-wavelengths of radio-frequency signals conducted along the slide strip.

4. A system for the slidable connection of a satellite antenna to a mobile radio comprising:

an antenna including a single retractable antenna element and at least two antenna contacts coupled thereto wherein the antenna contacts retract with the antenna element; and at least two slide strips, slidably coupled respectively to the at least two antenna contacts when the single retractable antenna element is in a plurality of retracted positions, the at least two slide strips being coupled to a transceiver in the mobile radio and conducting radio-frequency signals to maintain communication with the mobile radio;

a ground, a satellite antenna element, and a cellular antenna element, and wherein the at least two antenna contacts comprise a satellite contact configured for coupling with the satellite antenna element, a cellular contact configured for coupling with the cellular antenna element, and a ground contact configured for coupling with the ground; and at least two switches coupled to the transceiver and switchably coupled respectively to the at least two slide strips wherein:

when the single retractable antenna element is retracted into the plurality of retracted positions, the switches and the at least two antenna contacts couple to the at least two slide strips to maintain electrical connection between the transceiver and the antenna;

when the single retractable antenna element is moved into an extended position, the switches decouple from the at least two slide strips and couple to the at least two antenna contacts to maintain electrical connection between the transceiver and the antenna;

the switches comprise a cellular switch aligned with the cellular contact, a satellite switch aligned with the satellite contact, and a ground switch aligned with the ground contact;

and when the antenna is in the extended position, the cellular contact opens the cellular switch, the satellite contact opens the satellite switch, and the ground contact opens the ground switch.

5. A system for the slidable connection of a satellite antenna to a mobile radio comprising:

an antenna including a single retractable antenna element and at least two antenna contacts coupled thereto wherein the antenna contacts retract with the antenna element;

and at least two slide strips, slidably coupled respectively to the at least two antenna contacts when the single retractable antenna element is in a plurality of retracted positions, the at least two slide strips being coupled to a transceiver in the mobile radio and conducting radio-frequency signals to maintain communication with the mobile radio; and at least two switches coupled to the transceiver and switchably coupled respectively to the at least two slide strips wherein:

when the single retractable antenna element is retracted to the plurality of retracted positions, the switches and the at least two antenna contacts couple to the at least two slide strips to maintain electrical connection between the transceiver and the antenna;

and when the single retractable antenna element is moved into an extended position, the at least two switches decouple from the at least two slide strips and couple to the at least two antenna contacts to maintain electrical connection between the transceiver and the antenna;

and further comprising means for disconnecting the antenna from the transceiver.

6. The system of claim 5 wherein the at least two slide strips include a conductive portion.

7. The system of claim 5 further including means for connecting the transceiver to an extravehicular antenna.

8. The system of claim 7 wherein:

the means for disconnecting is a docking adapter including a cam feature;

the antenna includes a cam notch for fitting the cam feature;

and inserting the mobile radio into the docking adapter with the cam feature in the cam notch slides the antenna to a docking position.

9. The system of claim 5 wherein the means for disconnecting comprises pushing the single retractable antenna element out of contact with the conductive portion.

10. The system of claim 9 wherein the single retractable antenna element is positioned past the at least two slide strips.

11. A method for the slidable connection of a antenna to a mobile radio comprising the steps of:

providing an antenna including a single retractable antenna element and at least two antenna contacts coupled thereto wherein the at least two antenna contacts retract with the single retractable antenna element;

providing at least two slide strips coupled to a transceiver and configured to be slidably coupled respectively to the at least two antenna contacts;

and sliding the single retractable antenna element into a plurality of retracted positions and connecting the at least two antenna contacts respectively to the at least two slide strips to maintain a connection between the antenna and the transceiver while sliding through the plurality of retracted positions;

providing at least two switches coupled to the transceiver and switchably coupled respectively to the at least two slide strips;

sliding the single retractable antenna element into an extended position and decoupling the switches from the at least two slide strips;

and coupling the at least two switches to the at least two antenna contacts to maintain connection between the transceiver and the antenna.

12. The method of claim 11 wherein the step of sliding the single retractable antenna element into an extended position includes decoupling the at least two switches from the at least two slide strips while concurrently coupling the at least two switches to the at least two antenna contacts.

* * * * *